P. CATUCCI.
FISHING REEL.
APPLICATION FILED SEPT. 15, 1910.

1,016,913.

Patented Feb. 6, 1912.

2 SHEETS—SHEET 1.

Witnesses:
Louis Sanders Jr.
Elizabeth Balling.

Pliny Catucci Inventor
By Louis N. Sanders Attorney

COLUMBIA PLANOGRAPH CO., WASHINGTON, D. C.

P. CATUCCI.
FISHING REEL.
APPLICATION FILED SEPT. 15, 1910.
1,016,913.
Patented Feb. 6, 1912.
2 SHEETS—SHEET 2.
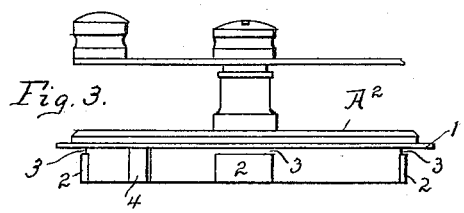
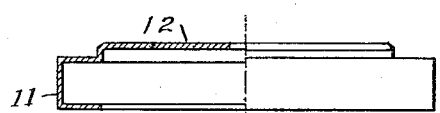
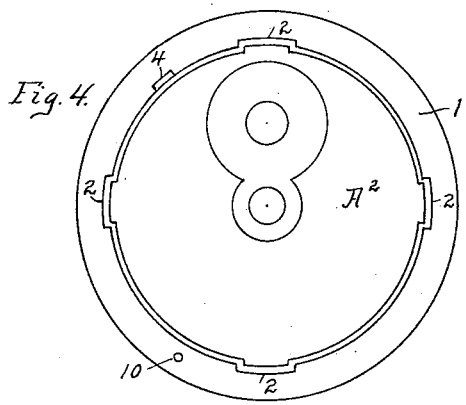
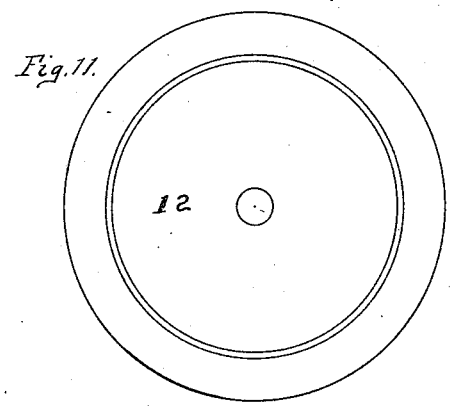
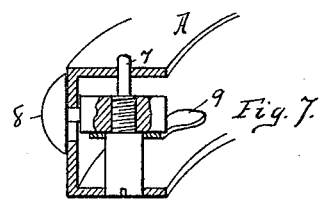
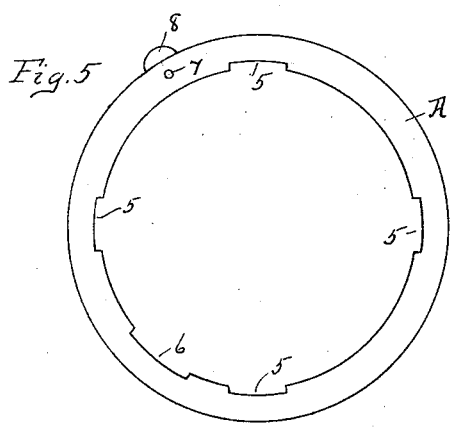
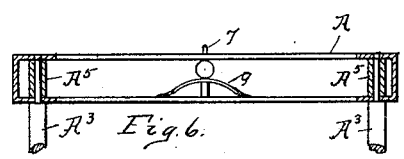
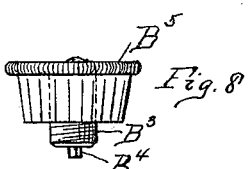
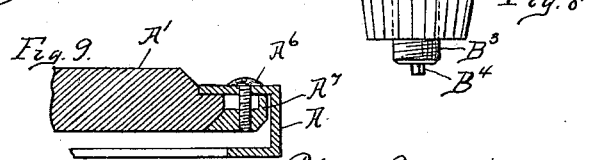
Witnesses:
Louis M. Sanders Jr.
Elizabeth Balling
Pliny Catucci Inventor
By Attorney
Louis M. Sanders
COLUMBIA PLANOGRAPH CO., WASHINGTON, D. C.

UNITED STATES PATENT OFFICE.

PLINY CATUCCI, OF NEWARK, NEW JERSEY.

FISHING-REEL.

1,016,913.   Specification of Letters Patent.   Patented Feb. 6, 1912.

Application filed September 15, 1910. Serial No. 582,135.

*To all whom it may concern:*

Be it known that I, PLINY CATUCCI, a citizen of the United States, residing in the city of Newark, county of Essex, and State of New Jersey, have invented certain new and useful Improvements in Fishing-Reels; and I do declare the following to be a full, clear, and exact description of the same, such as will enable others skilled in the art to which it pertains to make, construct, and use the same.

The object of my invention is to improve the general construction of fishing reels, and more particularly in the following respects: To construct the head rings of metal plates which are pressed into rings of channel shape in cross-section, so as to reduce their weight to a minimum consistent with the greatest possible strength; and to form the frame in connection with said rings of trusses, so as to materially strengthen it. To construct the front and rear headplates and their connections with the head rings in such a manner as to make both headplates readily detachable for purposes of inspection, cleaning and oiling. To so construct the spindle pivot bearing as to allow for end thrust adjustment, and at the same time prevent binding between the pivot and bearing.

A further improvement resides in the particular manner of securing the front headplate to the head ring, and the manner of incasing the plate in a flanged metal ring so as to secure accurate adjustment and alinement of the spindle pivot bearings.

In carrying out the objects of my invention, I make use of the structures illustrated in the accompanying drawings, wherein—

Figure 1:
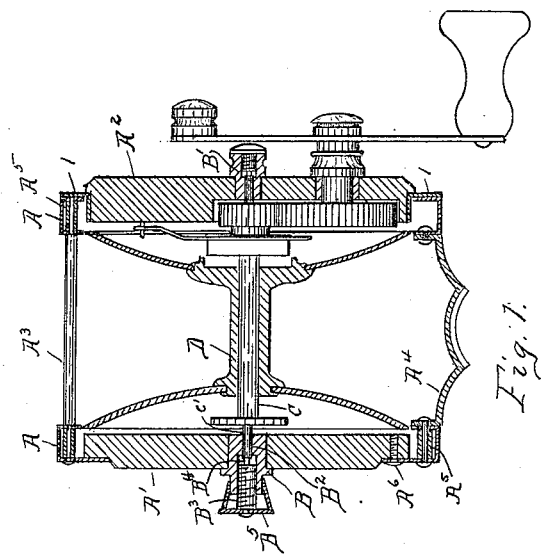
Figure 2:
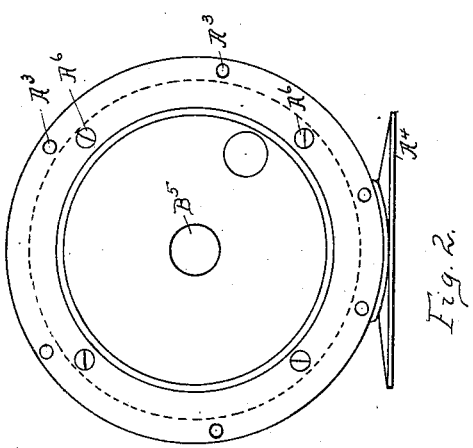

Figure 1 is a longitudinal section, and Fig. 2 is an end view of a fishing reel embodying my improvements. Fig. 3 is a side view of the headplate. Fig. 4 is an under plan of the same. Fig. 5 is a plan view of the head ring. Fig. 6 is a sectional view of the same. Fig. 7 is a perspective view, partly in section, showing the locking device. Fig. 8 is a side view (enlarged) of the pivot bearing adjusting screw and cap. Fig. 9 is a modified form of rear headplate connection. Fig. 10 is a view of a modified form of combined headplate and head ring. Fig. 11 is a plan view of the modification shown in Fig. 10.

The structures set forth in this application are, in the main, the same as those set forth in my prior application Ser. No. 547,925, filed March 7, 1910; and to the extent that both applications set forth common matter, this application is a division of said prior application.

In Fig. 1 of the drawings, I have illustrated a free-running reel in which the driving mechanism of the spool is substantially the same as that illustrated in a prior patent to A. F. Meisselbach and myself, No. 929,867, granted Aug. 3, 1909, and is fully described in such patent, so that no description is deemed to be necessary in this specification. Suffice it to say that the mechanism is of such character as to permit the free automatic paying out of the line from the spool, and yet be instantly under the control of the angler upon the slightest movement of the crank in the winding-up direction; this movement effectively and immediately checks the paying out of the line, the further movement of the crank resulting in winding up the line upon the spool. All these features are clearly pointed out and fully described in said prior patent.

The reel frame is composed of the head rings A, A, connected and solidly braced by the cross bars $A^3$, and the foot plate $A^4$. The rings A, A, are of peculiar truss construction and form an important feature of my invention. Each ring is made by cupping a disk of metal, so as to draw a circular flange around the disk; a circular piece is then cut from the bottom of the cup, after which a sectional die is fitted into the resulting flanged ring, and a portion of the flange which projects above the face of the die is then spun partially down and subsequently the incomplete ring is placed in a heavy press and the partially spun flange is pressed down flat upon the upper face of the sectional die, thus completing the forming operation. The die is then removed from the interior of the ring, which is then trimmed up and is ready to be drilled for the reception of the cross bars. The resulting head ring is channel-shaped in cross-section, with the flanges projecting toward the center, thus forming the strongest and lightest known structure—the circular truss.

As a means for connecting the rings A, A, as above described, I drill holes through the flanges, through which are inserted the shouldered cross bars $A^3$, the reduced ends of which snugly fit the holes, and in the case of the rear headplate, these reduced ends project through and are riveted down upon the outside ring flange. In order to still further strengthen the ring flange, I insert between them the short sections of metal tubing $A^5$, in registry with the holes, passing the cross bar ends through the holes and tubes, then riveting the cross bar ends upon the outside, as shown. Inasmuch as the front headplate differs slightly from the rear headplate, and requires the outside ring flange to be flat with no projections thereon, I make the tubes or thimbles $A^5$, a trifle shorter than the distance between the flanges, and then rivet the cross bar ends at the outer ends of the tubes $A^5$, thus leaving the outside ring flange smooth and flat. The foot plate $A^4$, is also secured to the flanges of the head rings by the rivets which pass through the flanges of both the foot plate and head ring. The resulting frame is of extreme strength and rigidity, and will not become distorted under the severest of ordinary use, while it possesses the very desirable quality of lightness.

I have shown in Fig. 1, two distinct methods for securing the headplates $A^1$, and $A^2$, to their head rings respectively. I prefer to use both methods as shown, in actual practice, but I do not wish to be considered as confining myself to this practice, as it will be readily seen that either method may be adopted for securing both plates to their respective rings. The method shown is preferred for the reason that it is seldom necessary to remove the rear head plate, and it may, therefore, be more permanently though not more rigidly fixed.

As shown, the outside flange of the rear head ring $A^1$, is somewhat wider than the inner flange, so that the plate A, may be of a diameter sufficient to pass the inner flange and rest flatly, with the recess of the plate against the outer flange, as clearly shown in the drawing. Screws may be employed to secure the plate in place as shown in either Fig. 1 or Fig. 9. In Fig. 1, the screws $A^6$, are shown as passing through the flange of the head ring directly into the headplate. In Fig. 9, I have shown the screws $A^6$, as passing through the outer flange and into the elbow nut $A^7$, one arm of which bears upon a chamfered notch in the inner margin of the plate $A^1$, while its other arm bears upon the inner face of the outer flange of the ring A. In either case, the several screws $A^6$, rigidly secure the plate $A^1$, to the ring A, and when necessary, the plate may be readily removed by removing the screws.

In Figs. 3 to 7 inclusive, I have shown a novel form of front headplate and the details of the means for securing it to the head ring. The plate $A^2$, is provided with a flanged metal ring 1, which fits over and is rigidly secured to the circumferential recess on the under side of the plate, as shown in section in Fig. 1. The flange of this ring 1, is sufficiently wide to give it a full bearing upon the inturned flange of the headring A. The ring 1, is provided with the four bosses 2, diametrically located upon its outside cylindrical portion. These bosses are of less depth than the width of the ring, so as to leave the narrow channels 3, just beneath the flange. The single stop boss 4, is also provided of a depth equal to the width of the ring 1.

The head ring A, has its outside flange notched at 5, to correspond in depth, width and position with the four bosses 2, upon the ring 1. I also provide the notch 6, in the head ring to correspond in position with the boss 4, of the ring 1, but of two or three times its width. If the plate $A^2$, and the ring A, are brought together with the bosses and notches properly located, and given a relatively slight turn, the solid portion of the flange of the head ring A, will take into the channels 3, while the boss 5, will form a stop against the end of the notch 6, thus securing the head ring and plate together against lateral displacement.

In order to lock the parts in position, I provide a small spring bolt 7, in the channel of the head ring A, as shown in Figs. 6 and 7, such bolt having the external slide button 8, connected therewith, by which the bolt may be withdrawn against the pressure of the small flat spring 9. The flange of the ring 1, is provided with a small hole 10, to receive the exposed head of the bolt 7, when the headplate $A^2$, and its ring 1, are given a slight turn in the ring A. When thus locked together, it is only necessary to depress the bolt 7, by means of the button 8, and give the plate $A^2$, a slight backward turn, to separate them.

In the headplate $A^1$, I secure in any suitable manner, as by screwing therein, the bearing bushing B, which has the accurately alined bearing $B^2$, therein to receive the spindle pivot $c^1$. The external portion of this bushing is cylindrical, while the outer end is provided with a screw threaded socket in alinement with the bearing $B^2$. Into this socket is screwed the end thrust adjusting stud $B^3$, which is provided with the central bearing boss $B^4$, which bears directly upon the end of the pivot spindle $c^1$. In this manner all end play of the spindle C may be taken up without disturbing the alinement of the long cylindrical bearing $B^2$, with the corresponding bearing $B^1$, in the other headplate. The stud $B^3$, is provided with a cap $B^5$, which has its flange slitted and inwardly turned to frictionally engage the external cylindrical portion of the bushing B, and thus serves not only as a dust guard or cap, but also to prevent the adjusting stud B³, from too readily turning. The bearing B¹, is of any usual type and need not be explained in detail. Mounted in these bearings B, B¹, is the usual spindle C, upon which is secured the spool D.

In the modification of the combined headplate and head ring as illustrated in Fig. 10, the disk of metal is cupped and flanged as at 11, as heretofore described; but the bottom as at 12 is not cut out. The bottom as at 12 of the cup may be pressed into a shape to imitate the separable headplate, or it may be left flat. In either case, the spindle bearing is secured directly in its center, and the other attachments are applied in the usual way.

I claim:

1. In a fishing reel, the combination of a reel frame, a spool mounted to rotate therein, said frame comprising a pair of flanged head rings channel-shaped in cross section, head plates detachably secured to said head rings to one of the flanges thereof, cross bars connecting said rings and passing through the flanges thereof, spacing tubes or thimbles located upon the cross bar-ends between the ring flanges and means for securing the cross bars to the ring flanges and spacing tubes or thimbles.

2. In a fishing reel, the combination of a reel frame, comprising a pair of flanged head rings, cross bars connecting said head rings, a rear headplate located in one of said head rings, means for securing said headplate in position comprising a plurality of elbow nuts, one arm of each of said nuts bearing upon the inner face of said headplate and the other arm of each of said nuts bearing upon the flange of the head ring, and screws for clamping said nuts, plate and flange together.

3. In a fishing reel, the combination of a head-ring consisting of a metallic ring, channel-shaped in cross-section, having its flanges of differing widths, a head plate and means for detachably securing said headplate to the wider flange of said head-ring.

4. In a fishing reel, a cylindrical metallic head ring having inturned flanges of differing widths at its upper and lower edges, a head plate, and means for detachably securing said head plate to the wider flange of said head ring.

5. In a fishing reel, a head ring consisting of a metal ring having flat flanges at its upper and lower edges, said flanges being of different widths and directed toward the center of the ring to form a ring of channel shape in cross section, a head plate, and means for detachably securing said head plate to the wider flange of said head ring.

6. In a fishing reel, the combination of a head plate, a flanged ring embracing said head plate and a head ring, means for connecting said rings comprising a plurality of bosses upon one of said rings, and a plurality of recesses or notches in the other ring and locking means to secure said parts together.

7. In a fishing reel, the combination of a flanged head ring, a front headplate having a flanged metal ring embracing the same, and secured thereto, a plurality of bosses upon the circumference of said ring, channels between said bosses and the flange of said ring, a plurality of notches in the flange of said head ring to receive said bosses and permit the continuous portion of the flange of the head ring to pass into the channels adjacent to the bosses on the flanged ring of the headplate, means to limit the relative rotation of the engaged parts, and means for locking the headplate and head ring in such engagement.

This specification signed and witnessed this 9th day of Sept., 1910.

PLINY CATUCCI.

Witnesses:
 LOUIS M. SANDERS,
 LOUIS M. SANDERS, Jr.

Copies of this patent may be obtained for five cents each, by addressing the "Commissioner of Patents, Washington, D. C."